(12) United States Patent
Rahman (10) Patent No.: US 11,909,580 B2
(45) Date of Patent: Feb. 20, 2024

(54) RECOVERING FROM DATA STALL EVENT IN A MULTI-NETWORK ENVIRONMENT

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 115 days.

(21) Appl. No.: 17/572,469

(22) Filed: Jan. 10, 2022

(65) Prior Publication Data

US 2023/0224206 A1    Jul. 13, 2023

(51) Int. Cl.
| | | |
|---|---|---|
| *H04L 41/0668* | (2022.01) | |
| *H04L 43/0811* | (2022.01) | |
| *H04L 43/0894* | (2022.01) | |
| *H04W 76/38* | (2018.01) | |
| *H04L 43/16* | (2022.01) | |
| *H04L 67/75* | (2022.01) | |

(52) U.S. Cl.
CPC ...... *H04L 41/0668* (2013.01); *H04L 43/0811* (2013.01); *H04L 43/0894* (2013.01); *H04L 43/16* (2013.01); *H04L 67/75* (2022.05); *H04W 76/38* (2018.02)

(58) Field of Classification Search
None
See application file for complete search history.

(56) References Cited

U.S. PATENT DOCUMENTS

| | | | | |
|---|---|---|---|---|
| 2011/0319072 | A1* | 12/2011 | Ekici | H04W 48/18 |
| | | | | 455/553.1 |
| 2019/0373526 | A1* | 12/2019 | Chow | H04W 36/14 |
| 2020/0383027 | A1* | 12/2020 | Venkataraman | H04W 36/305 |
| 2021/0243654 | A1* | 8/2021 | Saltsidis | H04W 28/0247 |
| 2022/0248494 | A1* | 8/2022 | Gummadi | H04W 76/19 |
| 2023/0015436 | A1* | 1/2023 | Peitzer | H04W 36/125 |

FOREIGN PATENT DOCUMENTS

WO    WO-2021247753 A2 * 12/2021

* cited by examiner

*Primary Examiner* — Anh Vu H Ly
(74) *Attorney, Agent, or Firm* — Lee & Hayes, P.C.

(57) ABSTRACT

Systems may comprise a connectivity manager application operating on a User Equipment (UE) for optimal and secure performance of local applications and improving user experience by optimizing application performance (e.g., detecting data stall events). The systems may monitor incoming internet protocol (IP) packets for one or more applications operating on the UE. The connectivity manager application may detect a drop in a rate at which the IP packets are received over a period of time and determine to reregister and/or reattach to a different node within a network or at a new network.

20 Claims, 5 Drawing Sheets

RECOVERING FROM DATA STALL EVENT IN A MULTI-NETWORK ENVIRONMENT

BACKGROUND

A mobile computing device is typically capable of accessing multiple different types of cellular networks to transmit data via applications operating on the mobile computing device. When the mobile computing device experiences a change in performance of the application (e.g., a sudden drop in bandwidth), a user may attempt to troubleshoot the issue by powering the mobile computing device off and then back on again. However, although this may reset a connection to a network, many other operations on the mobile computing device may be unnecessarily rebooted, thereby wasting computational resources of the mobile computing device as well as time of the user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Systems, methods, and apparatuses (hereinafter the "system") disclosed herein may include a connectivity manager application operating on a User Equipment (UE) for managing data transmission of other applications stored and/or executing on the UE (e.g., "local applications") in a multi-network environment. For instance, the UE may connect to a variety of different networks having different network characteristics (e.g. fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX® technology, Wi-Fi®, etc.) Moreover, the network characteristics of the network to which the UE connects may not be persistent and/or may change suddenly. In such cases, a local application presenting content and/or being interacted with by a user associated with the UE may experience poor user experience due to poor data transmission.

In some examples, the connectivity manager application may perform one or more steps for improving the data transmission performance of the local application in the multi-network environment. For instance, the connectivity manager application may comprise a packet rate monitor to determine one or more network characteristics (e.g., bandwidth, latency, etc.) of one or more networks forming the multi-network environment and/or one or more nodes within the networks. In some instances, the packet rate monitor may continually monitor internet protocol (IP) packets received by the UE (e.g., via the local applications and/or a radio protocol stack of the UE) to determine a packet rate associated with the received IP packets. In some cases, the packet rate monitor may determine that a packet rate has fallen below a threshold (e.g., 50 packet per second (PPS), 30 PPS, 25 PPS, etc.) and determine that the UE is about to experience a data stall event. For example, the user may be interacting with one or more of the local applications stored on the UE (e.g., browsing the internet, watching a video, playing a game, etc.) that receive the IP packets from a node of the network in order to render content associate with the local application on the UE. The packet rate monitor may monitor the rate at which these IP packets are received and in cases of a slow down in the rate (e.g., the packet rate falls below a predefined threshold), may determine that the local application and/or the UE is about to experience a data stall event. That is, the local application will not have the necessary IP packet to continue to render the content being consumed, or otherwise being interacted with, by the user.

In some cases, once the packet rate has dropped below a threshold value, the connectivity manager application may start a timer used to determine when the UE should attempt to reattach and/or reregister with a new node of the network and/or a different network. For example, a small interruption in the flow of the IP packet (e.g., 3 or 4 microseconds, milliseconds, etc.) may not cause any perceptible change to the content being consumed by the user. In some cases, in response to the packet rate still being below the threshold value when the timer expires (e.g., 5 seconds, 10 seconds, 30 seconds, etc.), the connectivity manager application may send a detach request to the node that the UE is currently connected to, allowing the UE to subsequently reattach to a new node that is fully operational. In some cases, the connectivity manager application may be configured to instruct a MODEM of the UE to detach from the current node and reattach and/or reregister with a new node. In this way, the UE may begin the reattach and/or reregister process without needing to be powered off and on again, thereby avoiding wasting computational resources of the mobile computing device as well as time of the user. In some cases, the connectivity manager application may provide a notification via a graphical user interface (GUI) to the user letting them know that the UE is performing a reattach and/or reregistration while in other cases, the UE may perform the operations without notifying the user.

In some examples, the connectivity manager application may comprise a local application controller for communicating with and causing changes to one or more local applications on the UE. The local application controller may generate and/or send one or more API calls to a first local application, a second local application, a third local application, and/or any number N local applications. For instance, the local application controller may send an API call to the first local application instructing the first local application to change a transmission parameter (e.g., to inhibit, pause, and/or adjust data downloads) for a particular transmission path. The local application controller may generate and/or send multiple API calls to the first local application, the second local application, the third local application, etc., to change multiple transmission parameters of multiple transmission paths.

In some examples, operations performed by the connectivity manager application and/or other components of the system discussed herein may improve the functionality of a mobile computing device (e.g., the UE). By reattaching and/or reregistering to functional nodes in response to changing network characteristics (e.g., detecting a data stall event), the system may cause local applications operating on the UE to operate more efficiently and effectively while consuming less computing resources (e.g., CPUs of processing, bytes of memory, power from a battery) for instance, by avoiding having to power the UE off and on and refraining from straining the computing resources in an overloaded network. Moreover, by continually monitoring the packet rate and registering and/or attaching to the most operational node as the UE moves through different types of network coverages, and while the traffic on the networks changes, a more efficient mode of operation for the UE is maintained.

Figure 1:
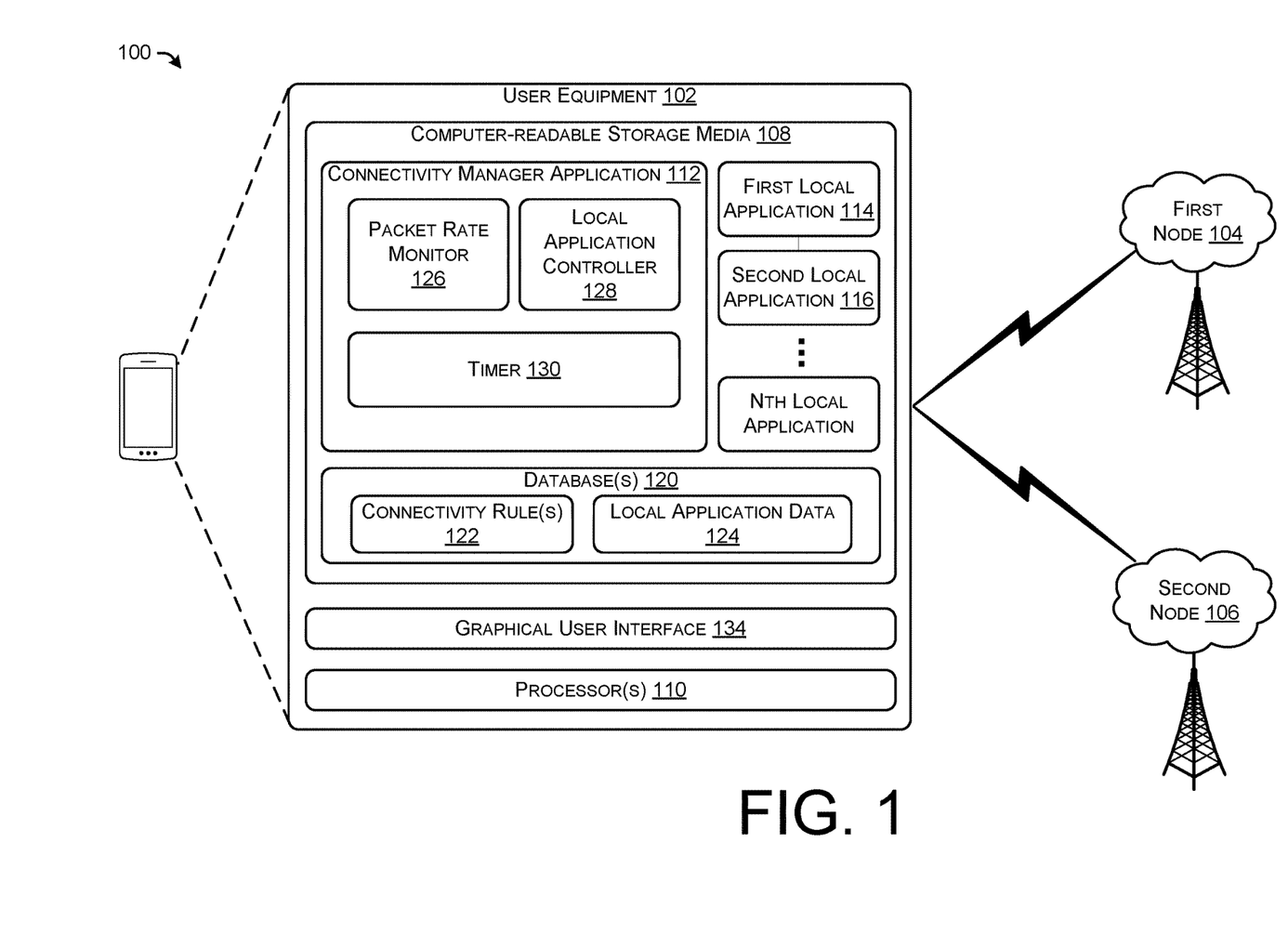
FIG. 1 depicts a schematic diagram of an example system for managing connectivity of local applications on a user equipment (UE) in a network environment.

FIG. 1 depicts an example system 100 for managing connectivity for a UE 102 in a network environment. The network environment may comprise a first node 104, a second node 106, or any number of nodes (which may be different types of networks comprising different network characteristics and/or different nodes of the same type of network) providing cellular service to the UE 102. The UE 102 may comprise non-transitory computer-readable storage media 108 and one or more processors 110 and for storing and executing a connectivity manager application 112 and one or more other local applications, such as a first local application 114, a second local application 116, and/or any number of local applications. The non-transitory computer-readable storage media 108 may comprise one or more databases 120 storing data generated and/or retrieved by the connectivity manager 112 for managing connectivity of the local applications. For instance, the one or more databases 120 may store one or more connectivity rules 122 and/or local application data 124.

Figure 3:
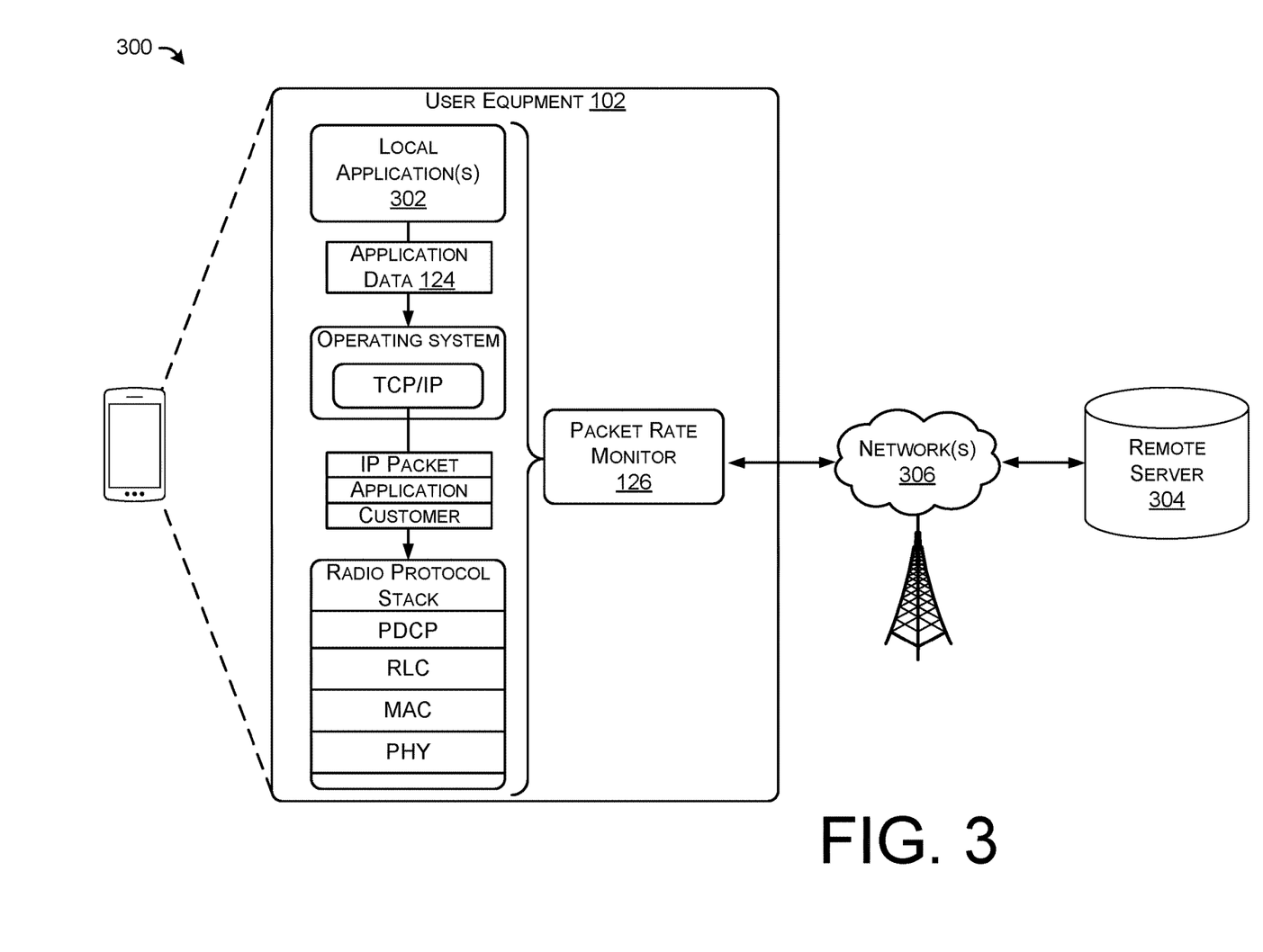
FIG. 3 depicts a schematic diagram of a packet rate monitor for monitoring one or more internet protocol (IP) packet flows, which may form at least a portion of any system discussed herein.

In some examples, the UE 102 may comprise a computing device associated with a client, end-user, calling party, and/or a terminating device, such as a Session Initiated Protocol (SIP)-enabled handset. The UE 102 may comprise a wireless communication interface for establishing cellular connections with service provider networks, for instance, multiple different types of networks. The UE 102 may comprise a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as non-mobile computing devices including, without limitation, a television (smart television), set-top-box (STB), desktop computer, and the like. The UE 102 is discussed in further detail below (FIG. 3).

In some examples, the first node 104 and/or the second node 106 may operate in a 3rd Generation Partnership Program (3GPP) wireless network, such as a 3G network, a 4G network, a 4G Long Term Evolution (LTE) network, a LTE Advanced network, a 5G network, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX® technology, Wi-Fi®, an evolved IP Multimedia System (IMS) network, combinations thereof, and the like. The first node 104 and/or the second node 106 may comprise wireless nodes or wired nodes, that are coupled to a core network and/or some other network. The core network may also include one or more access points, one or more gateways, and one or more service nodes. The first node 104 and/or the second node 106 may handle traffic and signals between electronic devices, such as the UE 102. For example, the first node 104 and/or the second node 106 may perform transcoding of speech channels, allocation of radio channels to electronic devices, paging, transmission and reception of voice and data, as well as other functions. The first node 104 and/or the second node 106 may comprise one or more base transceiver stations (BTS), each BTS may include a transceiver, antenna, and additional network switch and control equipment that provide a network cell for facilitating wireless communication between the UE 102 and the first node 104 and/or the second node 106. In some examples, the first node 104 and/or the second node 106 may include an access node such as a gNodeB and/or an eNodeB.

In some examples, the second node 106 may operate via a different type of network than the first node 104. The second node 106 may operate via a 3rd Generation Partnership Program (3GPP) wireless network, such as a 3G network, a 4G network, a 4G Long Term Evolution (LTE) network, a LTE Advanced network, a 5G network, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX® technology, Wi-Fi®, an evolved IP Multimedia System (IMS) network, combinations thereof, and the like. The first node 104 and the second node 106 may operate via any combination of the different network types.

In some examples, the UE 102 may comprise the non-transitory computer-readable storage media 108 for storing data and algorithms to be executed. The non-transitory computer-readable storage media may comprise one or more memory components such as a phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, combinations thereof, or any other medium that can be used to store information for retrieval by an electronic computing device. Databases discussed herein, for instance stored at non-transitory computer-readable storage media 108, may include one or more of a comma delimited list, a spreadsheet, an array, a NoSQL data structure, a hash-based data structure, an object-based data structure, or any other data type, data structure, and/or data system for storing retrievable data.

In some examples, the UE 102 may comprise the one or more processor(s) 110, such as a microprocessor, a microcomputer, a microcontroller, a digital signal processor, a central processing unit (CPU), a graphics processing unit (GPU), a quantum processor, combinations thereof, etc. Among other capabilities, the one or more processor(s) 110 may operate to fetch and execute computer-readable instructions stored in the non-transitory computer-readable storage media 108, for instance, to perform the operations disclosed herein.

In some examples, the UE 102 may store and/or execute the connectivity manager application 112. The connectivity manager application 112 may comprise algorithmic components (e.g., software) for performing operations on the UE 102, such as a packet rate monitor 126, a local application controller 128, and/or a timer 130. Although the algorithmic components of the connectivity manager application 112 may be described as distinct components, in some instances, one or more of the packet rate monitor 126, the local application controller 128, and/or the timer 130 may be functionally combined and/or interact with each other to perform operations described herein. Although various elements of FIG. 1 are shown and described as being discrete devices or components for purposes of discussion, any of the illustrated executable components may, in practice, include one or more physical, virtual, or otherwise abstracted cluster or network of machines and/or devices. Moreover, although a single UE 102 is depicted, the system 100 may include any number and types of UEs 102.

In some examples, the connectivity manager application 112 may perform one or more steps for improving the data transmission performance of the local application in the network environment. In some instances, the packet rate monitor 126 may continually monitor internet protocol (IP) packets received by the UE 102 (e.g., via the local applications and/or a radio protocol stack of the UE 102) to determine a packet rate associated with the received IP packets. In some cases, the packet rate monitor 126 may determine that a packet rate has fallen below a threshold (e.g., 50 packet per second (PPS), 30 PPS, 25 PPS, etc.) and determine that the UE 102 is about to experience a data stall event. For example, a user may be interacting with the first local application 114 (e.g., browsing the internet, watching a video, playing a game, etc.) that receives the IP packets from the first node 104 of the network in order to render content associate with the first local application 114 on the UE 102. The packet rate monitor 126 may monitor the rate at which these IP packets are received and in cases of a slowdown in the rate (e.g., the packet rate falls below a predefined threshold), may determine that the first local application 114 and/or the UE 102 is about to experience a data stall event. That is, the first local application 114 will not have the necessary IP packets to continue to render the content being consumed, or otherwise being interacted with, by the user.

In some cases, once the packet rate has dropped below a threshold value, the connectivity manager application 112 may start the timer 130 to determine when the UE 102 should attempt to reattach and/or reregister with a new node of the network and/or a different network, such as the second node 106. For example, a small interruption in the flow of the IP packets (e.g., 3 or 4 microseconds, milliseconds, etc.) may not cause any perceptible change to the content being consumed by the user. In some cases, in response to the packet rate still being below the threshold value when the timer 130 expires (e.g., 5 seconds, 10 seconds, 30 seconds, etc.), the connectivity manager application 112 may send a detach request to the first node 104 that the UE 102 is currently connected to, allowing the UE 102 to subsequently reattach to the second node 106 that is fully operational. In some cases, the connectivity manager application 112 may be configured to instruct a MODEM of the UE 102 to detach from the first node 104 and reattach and/or reregister with a second node 106. In this way, the UE 102 may begin the reattach and/or reregister process without needing to be powered off and on again, thereby avoiding wasting computational resources of the mobile computing device as well as time of the user. In some cases, the connectivity manager application 112 may provide a notification via a graphical user interface (GUI 134) to the user letting them know that the UE 102 is performing a reattach and/or reregistration while in other cases, the UE 102 may perform the operations without notifying the user.

In some examples, the local application controller 128 may communicate and cause changes to the one or more local applications on the UE 102. The local application controller 128 may generate and/or send one or more API calls to the first local application 114, the second local application 116, and/or any number N local applications. For instance, the local application controller 128 may send an API call to the first local application 114 instructing the first local application 114 to change a transmission parameter (e.g., to inhibit, pause, and/or adjust data downloads) for a particular transmission path. The local application controller 128 may generate and/or send multiple API calls to the first local application 114, the second local application 116, etc., to change multiple transmission parameters of multiple transmission paths.

In some examples, the GUI 134 may comprise a front-end of the connectivity manager application 112 or another application receiving information from the connectivity manager application 112 or a remote server (e.g., remote server 304 in FIG. 3, which may, in some examples, aggregate data from multiple connectivity manager applications 112 of multiple UEs 102).

Figure 2:
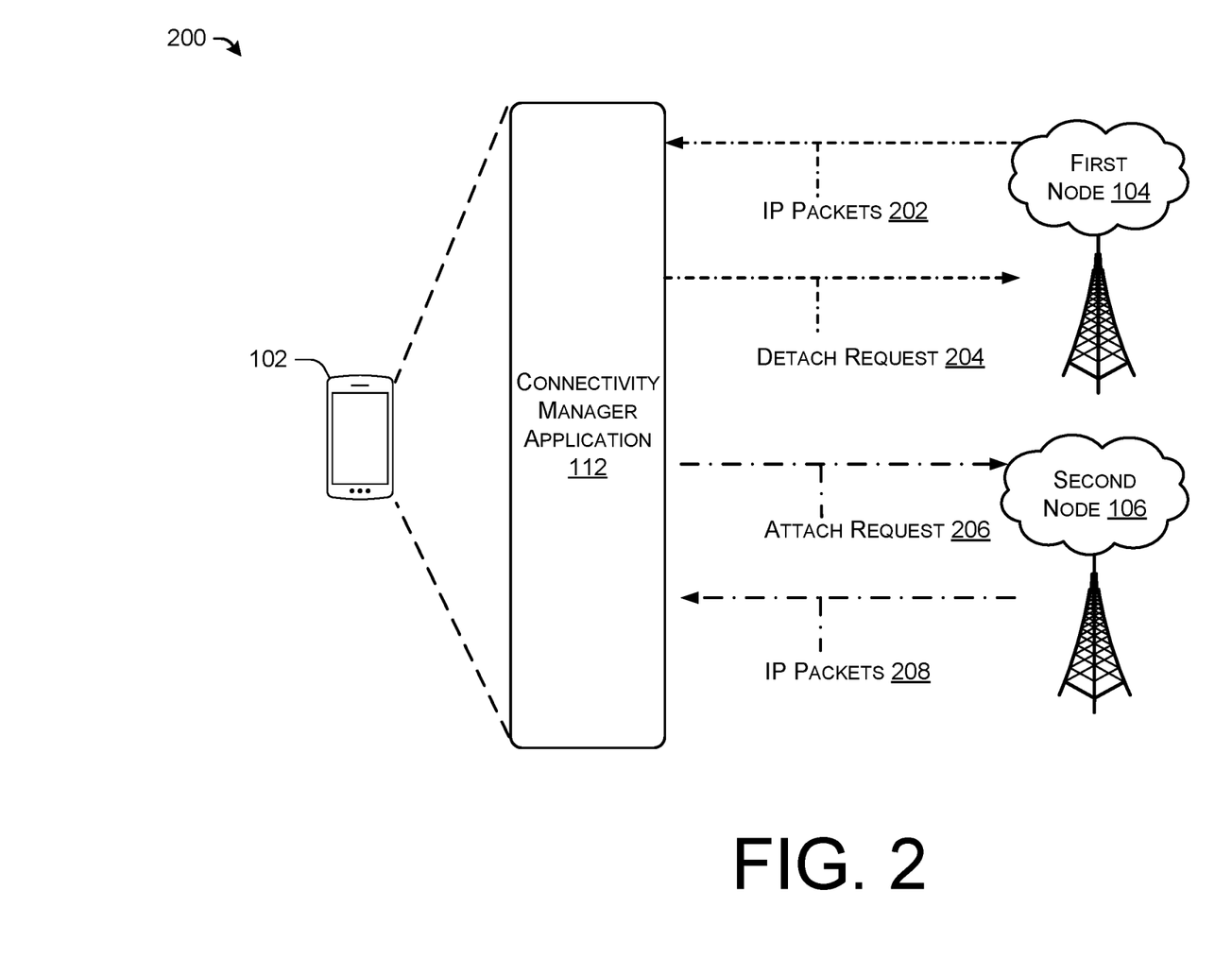
FIG. 2 depicts a schematic diagram of an example connectivity manager application for detecting one or more network characteristics, which may form at least a portion of any system discussed herein.

FIG. 2 depicts an example system 200 that may be similar to, identical to, or form a portion of any of the systems discussed herein. FIG. 2 illustrates details of the connectivity manager application 112 which may monitor the flow of IP packets 202 received from the first node 104.

In some examples, the connectivity manager application 112 may continually or periodically query various network resources and/or components of the UE 102 to determine network characteristics of the network providing service to the UE 102. In some instances, the connectivity manager application 112 may receive information from the local applications indicating network characteristics. In some examples, the connectivity manager application 112 may determine a network type identifier (e.g., "5G" or "Wi-Fi"), IP address, and/or MAC address associated with the first node 104 and/or the second node 106 (e.g., via a SIP ACK message, ping, etc.) and may determine one or more predefined characteristics corresponding to the network type identifier IP address, and/or MAC address, such as a bandwidth, a throughput, and/or a latency. For instance, the one or more database(s) 120 may store network persistent or generally constant network characteristic information associated with the network type identifier, IP address, and/or MAC address. The connectivity manager application 112 may determine changing, dynamic, or inconsistent network characteristics, for instance, by monitoring the flow of IP packets 202 received from the first node 104. The connectivity manager application 112 may determine one or more changing network characteristics of the first node 104 or the second node 106, such as a congestion increase or decrease, a traffic increase or decrease, a throughput increase or decrease, a bandwidth increase or decrease, and/or a security update.

In some cases, the connectivity manager application 112, via the packet rate monitor 126, may determine that a packet rate of the IP packets 202 has fallen below a threshold (e.g., 50 packet per second (PPS), 30 PPS, 25 PPS, etc.) and determine that the UE 102 is about to experience a data stall event. For example, a user may be interacting with the first local application 114 (e.g., browsing the internet, watching a video, playing a game, etc.) that receives the IP packets 202 from the first node 104 of the network in order to render content associate with the first local application 114 on the UE 102. The connectivity manager application 112, via the packet rate monitor 126, may monitor the rate at which the IP packets 202 are received and in cases of a slowdown in the rate (e.g., the packet rate falls below a predefined threshold), may determine that the first local application 114 and/or the UE 102 is about to experience a data stall event. That is, the first local application 114 will not have the necessary IP packets 202 to continue to render the content being consumed, or otherwise being interacted with, by the user.

In some cases, once the packet rate has dropped below a threshold value, the connectivity manager application 112 may start the timer 130 to determine when the UE 102 should attempt to reattach and/or reregister with a new node of the network and/or a different network, such as the second node 106. For example, a small interruption in the flow of the IP packets 202 (e.g., 3 or 4 microseconds, milliseconds, etc.) may not cause any perceptible change to the content being consumed by the user. In some cases, in response to the packet rate still being below the threshold value when the timer 130 expires (e.g., 5 seconds, 10 seconds, 30 seconds, etc.), the connectivity manager application 112 may send a detach request 204 to the first node 104 that the UE 102 is currently connected to, allowing the UE 102 to subsequently reattach to the second node 106 by sending an attach request 206. In some cases, the connectivity manager application 112 may be configured to instruct a MODEM of the UE 102 to detach from the first node 104 and reattach and/or reregister with a second node 106. In this way, the UE 102 may begin the reattach and/or reregister process without needing to be powered off and on again, thereby receiving IP packets 208 from the second node 106 without wasting computational resources of the mobile computing device as well as time of the user.

FIG. 3 depicts an example system 300 that may be similar to, identical to, or form a portion of any of the systems discussed herein. FIG. 3 illustrates details of the packet rate monitor 126, for instance, monitoring a flow of IP packets for one or more local applications 302 (e.g., first local application 114 and/or second local application 116).

In some examples, the packet rate monitor 126 may determine one or more transmission paths based at least in part on information received from the local applications on the UE 102 (e.g., the first local application 114 and/or the second local application 116), the one or more databases 120, the first node 104 or second node 106, and/or from a remote server 304 (e.g., by connecting to one or more networks 306, such as via the first node 104 and/or the second node 106), such as one or more multipurpose internet mail extension (MIME) type data. In some examples, the transmission paths may comprise a one-to-one correspondence with one or more types of data, such that individual transmission paths are dedicated to a particular type of data (e.g., video, images, text, etc.). In some instances, the packet rate monitor 126 may monitor and/or collect information (e.g., continuously or periodically) regarding run-time activities of the local applications 302 or (at least portions of) application platforms executed on the UE 102. The packet rate monitor 126 may determine the one or more transmission paths, for instance, by determining one or more strings from a header portion or a body portion of a message sent from the local applications 302 and comparing the one or more strings to a plurality of data type profile strings indicating the one or more transmission paths. The packet rate monitor 126 may determine a type of data being sent during the run-time activities (e.g., based on one or more MIME types, filenames, or filename extensions) and may timestamp local application run-time activities and/or categorize local application run-time activities based on the type of data being transmitted during the run-time activities. Information collected by the packet rate monitor 126 may comprise application names corresponding to the local applications 302, types of data sent by the local applications 302, a frequency with which a particular type of data is sent (e.g., IP packet flow rates), user ID (UID) of the applications, type or category of the local applications 302, destination IP addresses and domain names (or SNIs) of the local applications 302, the timestamps, and quantity of data associated with the respective application. The packet rate monitor 126 may, in some cases, indicate the particular application that generated a particular data packet. As examples, different application identifiers may correspond respectively to applications such as social media, graphic editing, video conferencing, etc. Alternatively, application identifiers may correspond to application types, such as video, audio, email, shopping, chat, finance, health, industrial control, etc. An application identifier may also correspond to a server application to which the data packet is destined. The customer identifier may indicate or correspond to a customer, such as an individual or organization using the UE 102 or to whom the UE 102 belongs. As another example, the customer identifier may indicate or correspond to a particular customer account with which the UE 102 is associated, and/or the customer identifier may indicate or correspond to a provider of services with which a received data packet is associated.

In some examples, the packet rate monitor 126 may determine one or more endpoint addresses and/or pathnames corresponding to one or more transmission paths of the local applications 302 (e.g., the first local application 114 and/or the second local application 116). The pathnames may comprise an alphanumeric string including an indication of a data type (e.g., "videos," "images," "thumbnail," "audio," "screenshot," "text," "comments," "ads"), and/or an application identifier (e.g., social media, email, audio streaming, etc. application names), and/or other information indicating a type of data transmitted by the transmission path. For instance, the packet rate monitor 126 may determine a first pathname of a first transmission path of the first local application 114 comprises "ads.example.com;" a second pathname of a second transmission path of the first local application 114 comprises "videos.example.com;" a third pathname of a third transmission path of the first local application 114 comprises "thumbnails.example.com;" etc. In some instances, the one or more databases 120 may store predetermined local application data indicating pathnames of transmission paths for particular local applications 302 (e.g., commonly downloaded applications). In some examples, the packet rate monitor 126 may access information from a third-party ad tracker to determine the one or more transmission paths, corresponding pathnames, and/or types of data being transmitted by the one or more transmission paths. The packet rate monitor 126 may query the local applications 302 for a list of directory names and/or determine whether any directory names include an alphanumeric string indicating a type of data (e.g., "profile pictures," "videos," "comments," etc.). In some instances, the packet rate monitor 126 may access one or more UE 102 device settings and/or application updates to determine one or more transmission paths, pathnames, and/or types of data being transmitted by the first local application 114 and/or the second local application 116. For example, the packet rate monitor 126 may determine that data is being transmitted via a WebSocket and may determine that the WebSocket corresponds to a video type of data. The packet rate monitor 126 may determine that the data is being transmitted via an Hypertext Transfer Protocol (HTTP) request, and/or a different type of request (e.g., a TCP message, an internet control message protocol (ICMP) message, a distributed network protocol (DNP) message, etc.) indicating a particular type of data (e.g., Hypertext Markup Language (HTML) text). In some instances, the packet rate monitor 126 may continually monitor and/or determine the one or more transmission paths, may determine the transmission paths in response to particular network characteristic or detecting a changed network characteristic, or may determine the transmission paths in response to receiving an update for the local applications 302.

In some examples, the packet rate monitor 126 may determine the one or more transmission paths, pathnames, and/or types of data being transmitted by the one or more transmission paths based on monitoring or detecting operations of the UE 102 at one or more communication protocol levels. For instance, the packet rate monitor 126 may receive data from a radio protocol stack which may comprise a part of baseband or modem of the UE 102. The packet rate monitor 126 may receive information from an upper-level Packet Data Convergence Protocol (PDCP) layer, one or more lower Radio Link control (RLC) layers, one or more yet lower Medium Access Control (MAC) layers, and/or one or more Physical (PHY) layers. The PDCP layer may receive data packets that have been provided for transmission through the protocol layers. The first application 114 and/or the second application 116 stored and/or executed on the UE 102 may, during operation, generate and provide application data to the device operating system for eventual wireless transmission. The application data may include any types of data and network communications to be transmitted wirelessly. The device operating system may comprise the TCP/IP layer that packetizes the application data into one or more IP data packets. The packet rate monitor 126 may receive information from any of these protocol layers to identify the transmission paths, pathnames, determine IP packet rates, and/or types of data being transmitted by the transmission paths.

The packet rate monitor 126 may apply one or more processes to combinations of application data for identifying transmission paths, pathnames, and/or types of data being transmitted of the local applications 302 (e.g., the first local application 114 and/or the second local application 116). For example, packet rate monitor 126 may use a pattern matching algorithm to identify at least one matching pattern in the application data or combinations of application data. Detecting or classifying a type of data associated with a particular transmission path may be based on identifying a matching pattern and/or a nearest approximation of a matching pattern.

In some examples, the packet rate monitor 126 may determine the transmission paths, pathnames, and/or types of data based on a log of historical data of traffic from the local applications 302. Such historical data may be generated by a traffic logger and may comprise information regarding the traffic data. For example, the historical data may comprise type or category of the traffic data, source and destination internet protocol (IP) addresses and port protocols, source and destination domain names (e.g., such as server name indications (SNIs)), timestamps of the traffic, and size of the traffic, among other things. In some implementations, historical data of traffic on the network may be based on event data records (EDR), which may comprise duration of the traffic, data volume of the traffic, and web site/content accessed with the traffic.

In some examples, the packet rate monitor 126 may send information indicating the local applications 302 stored and/or operating on the UE 102 (e.g., the first local application 114 and/or the second local application 116), information indicating the pathnames of the transmission paths for the local applications 302, information indicating the types of data transmitted by the transmission paths, information indicating a frequency or time of occurrence that the transmission paths transmit data.

Figure 4:
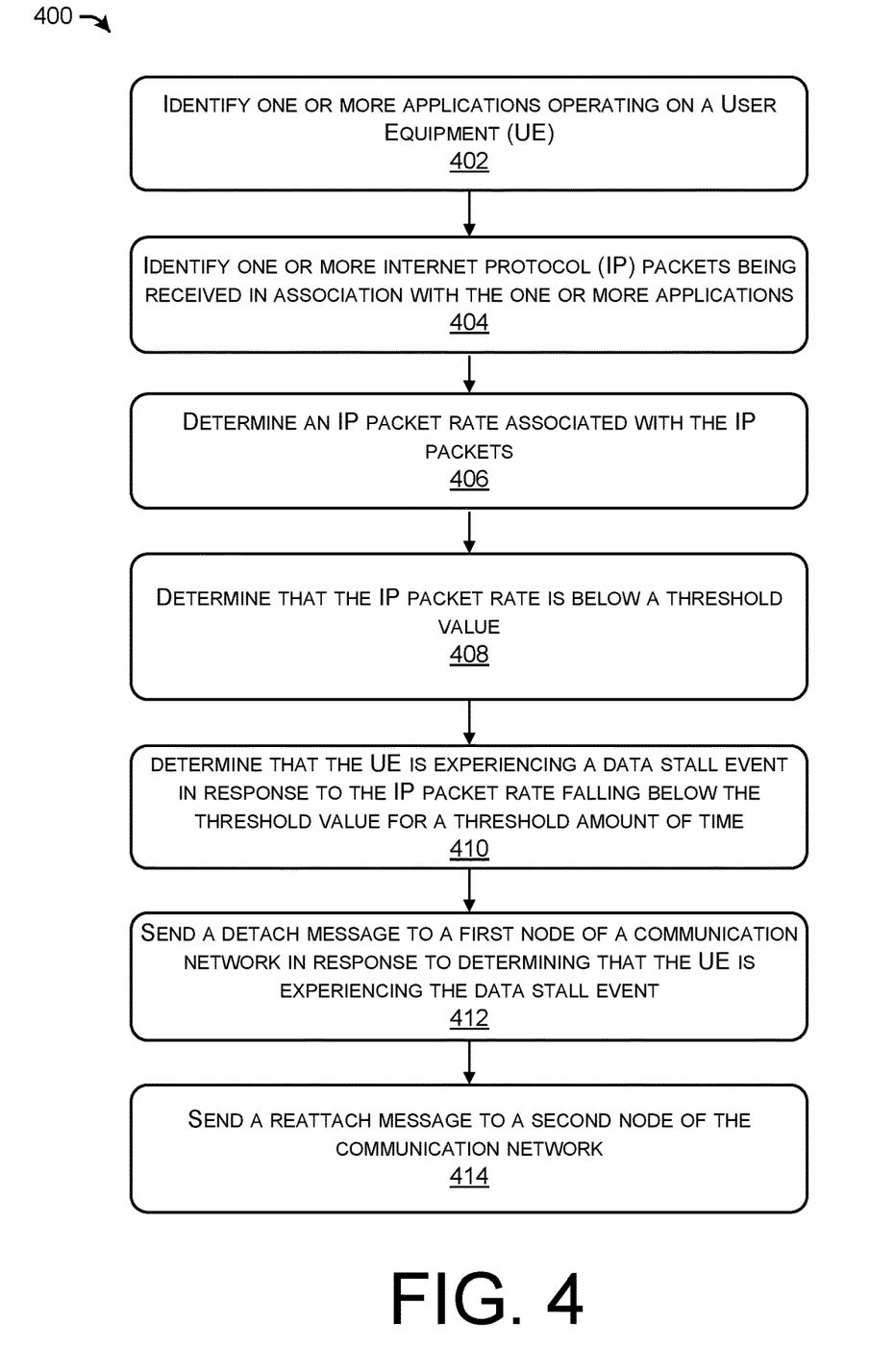
FIG. 4 depicts an example flow diagram illustrating a method for managing application connectivity in a network environment, which may be performed by any system discussed herein.

FIG. 4 depicts an example method 400 that may be performed by any of the systems discussed herein. In some examples, the method 400 may include one or more steps for managing local application connectivity for the UE 102 in the network environment. Although steps of the method 400 may be performed by any of the systems disclosed herein, the steps are described below as being performed by the system 100 for brevity sake.

At step 402, the system 100 may identify one or more applications operating on a User Equipment (UE). For instance, the UE 102 may comprise non-transitory computer-readable storage media 108 and one or more processors 110 and for storing and executing a connectivity manager application 112 and one or more other local applications, such as a first local application 114, a second local application 116, and/or any number of local applications.

At step 404, the system 100 may identify one or more internet protocol (IP) packets being received in association with the one or more applications.

At step 406, the system 100 may determine an IP packet rate associated with the IP packets. For instance, a user may be interacting with the first local application 114 (e.g., browsing the internet, watching a video, playing a game, etc.) that receives the IP packets from the first node 104 of the network in order to render content associate with the first local application 114 on the UE 102. The packet rate monitor 126 may monitor the rate at which these IP packets are received.

At step 408 the system 100 may determine that the IP packet rate is below a threshold value. For instance, in cases of a slowdown in the rate (e.g., the packet rate falls below a predefined threshold), may determine that the first local application 114 and/or the UE 102 is about to experience a data stall event. That is, the first local application 114 will not have the necessary IP packets to continue to render the content being consumed, or otherwise being interacted with, by the user. In some instances, the packet rate monitor 126 may continually monitor internet protocol (IP) packets received by the UE 102 (e.g., via the local applications and/or a radio protocol stack of the UE 102) to determine a packet rate associated with the received IP packets. In some cases, the packet rate monitor 126 may determine that a packet rate has fallen below a threshold (e.g., 50 packet per second (PPS), 30 PPS, 25 PPS, etc.) and determine that the UE 102 is about to experience a data stall event.

At step 410, the system 100 may determine that the UE is experiencing a data stall event in response to the IP packet rate falling below the threshold value for a threshold amount of time. For instance, once the packet rate has dropped below a threshold value, the connectivity manager application 112 may start the timer 130 to determine when the UE 102 should attempt to reattach and/or reregister with a new node of the network and/or a different network, such as the second node 106. For example, a small interruption in the flow of the IP packets (e.g., 3 or 4 microseconds, milliseconds, etc.) may not cause any perceptible change to the content being consumed by the user.

At step 412, the system 100 may send a detach message to a first node of a communication network in response to determining that the UE is experiencing the data stall even. For instance, in some cases, in response to the packet rate still being below the threshold value when the timer 130 expires (e.g., 5 seconds, 10 seconds, 30 seconds, etc.), the connectivity manager application 112 may send a detach request to the first node 104 that the UE 102 is currently connected to causing the UE to detach from a communication session with the first node 104.

At step 414, the system 100 may send a reattach message to a second node of the communication network. For instance, in some cases, the connectivity manager application 112 may be configured to instruct a MODEM of the UE 102 to detach from the first node 104 and reattach and/or reregister with a second node 106. In this way, the UE 102 may begin the reattach and/or reregister process without needing to be powered off and on again, thereby avoiding wasting computational resources of the mobile computing device as well as time of the user.

Figure 5:
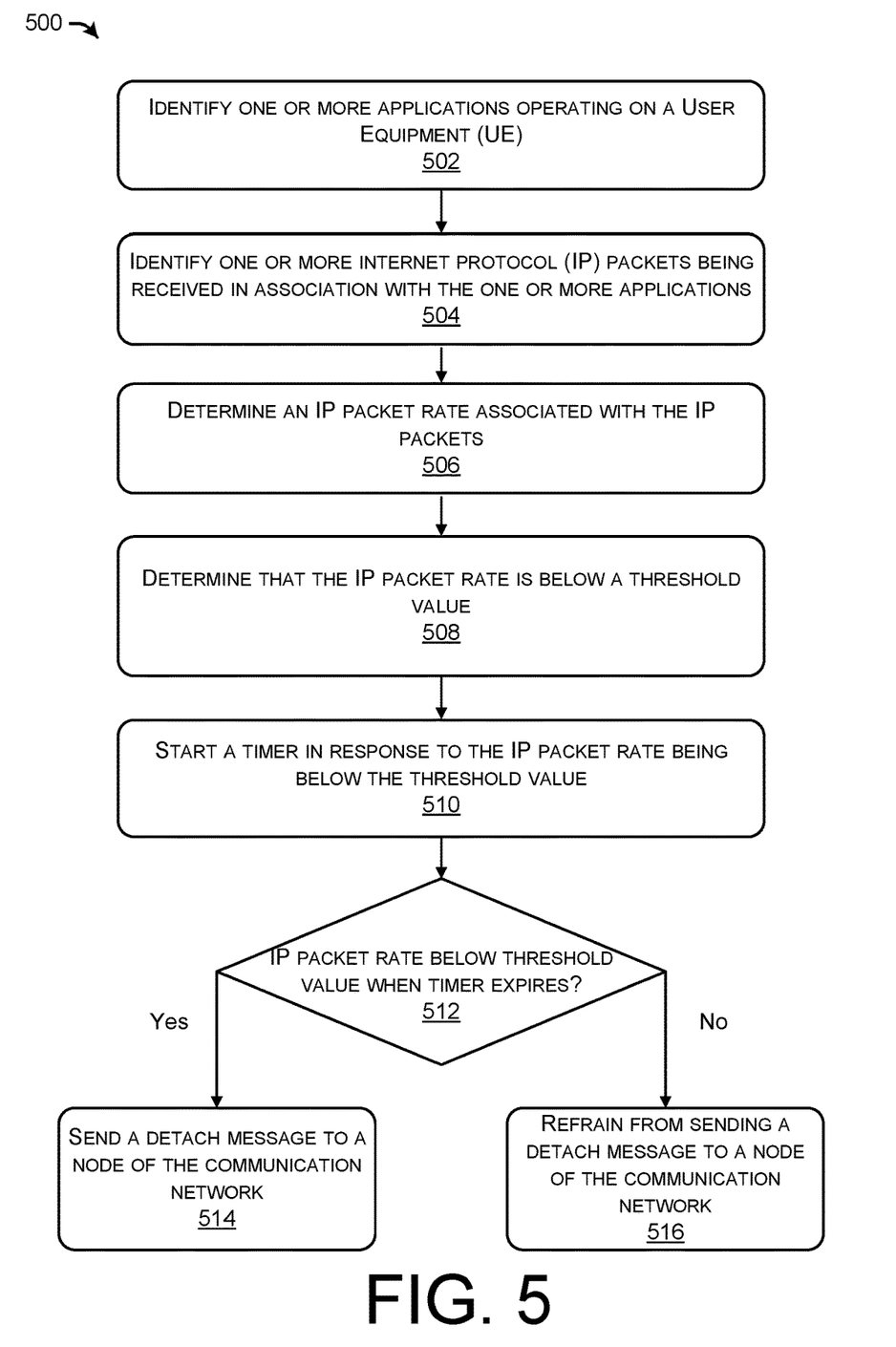
FIG. 5 depicts another example flow diagram illustrating a method for managing application connectivity in a network environment, which may be performed by any system discussed herein.

FIG. 5 depicts an example method 500 that may be performed by any of the systems discussed herein. In some examples, the method 500 may include one or more steps for managing local application connectivity for the UE 102 in the network environment. Although steps of the method 500 may be performed by any of the systems disclosed herein, the steps are described below as being performed by the system 100 for brevity sake.

At step 502, the system 100 may identify one or more applications operating on a User Equipment (UE). For instance, the UE 102 may comprise non-transitory computer-readable storage media 108 and one or more processors 110 and for storing and executing a connectivity manager application 112 and one or more other local applications, such as a first local application 114, a second local application 116, and/or any number of local applications.

At step 504, the system 100 may identify one or more internet protocol (IP) packets being received in association with the one or more applications.

At step 506, the system 100 may determine an IP packet rate associated with the IP packets. For instance, a user may be interacting with the first local application 114 (e.g., browsing the internet, watching a video, playing a game, etc.) that receives the IP packets from the first node 104 of the network in order to render content associate with the first local application 114 on the UE 102. The packet rate monitor 126 may monitor the rate at which these IP packets are received.

At step 508 the system 100 may determine that the IP packet rate is below a threshold value. For instance, in cases of a slowdown in the rate (e.g., the packet rate falls below a predefined threshold), may determine that the first local application 114 and/or the UE 102 is about to experience a data stall event. That is, the first local application 114 will not have the necessary IP packets to continue to render the content being consumed, or otherwise being interacted with, by the user. In some instances, the packet rate monitor 126 may continually monitor internet protocol (IP) packets received by the UE 102 (e.g., via the local applications and/or a radio protocol stack of the UE 102) to determine a packet rate associated with the received IP packets. In some cases, the packet rate monitor 126 may determine that a packet rate has fallen below a threshold (e.g., 50 packet per second (PPS), 30 PPS, 25 PPS, etc.) and determine that the UE 102 is about to experience a data stall event.

At step 510, the system 100 may determine that the UE is experiencing a data stall event in response to the IP packet rate falling below the threshold value for a threshold amount of time. For instance, once the packet rate has dropped below a threshold value, the connectivity manager application 112 may start the timer 130 to determine when the UE 102 should attempt to reattach and/or reregister with a new node of the network and/or a different network, such as the second node 1064. For example, a small interruption in the flow of the IP packets (e.g., 3 or 4 microseconds, milliseconds, etc.) may not cause any perceptible change to the content being consumed by the user.

At step 512, the system 100 may determine if the IP packet rate is below the threshold value when the timer expires. For instance, once the packet rate has dropped below a threshold value, the connectivity manager application 112 may start the timer 130 to determine when the UE 102 should attempt to reattach and/or reregister with a new node of the network and/or a different network, such as the second node 106.

At step 514, the system 100 may determine that the IP packet is below the threshold value when the timer expires and, in repose, may send a send a detach message to a node of a communication network. For instance, in some cases, in response to the packet rate still being below the threshold value when the timer 130 expires (e.g., 5 seconds, 10 seconds, 30 seconds, etc.), the connectivity manager application 112 may send a detach request to the first node 104 that the UE 102 is currently connected to causing the UE to detach from a communication session with the first node 104. For instance, in some cases, the connectivity manager application 112 may be configured to instruct a MODEM of the UE 102 to detach from the first node 104 and reattach and/or reregister with a second node 106. In this way, the UE 102 may begin the reattach and/or reregister process without needing to be powered off and on again, thereby avoiding wasting computational resources of the mobile computing device as well as time of the user.

At step 516, the system 100 may determine that the IP packet is not below the threshold value when the timer expires and, in repose, may refrain from sending a detach message to a node of a communication network. For example, a small interruption in the flow of the IP packets (e.g., 3 or 4 microseconds, milliseconds, etc.) may not cause any perceptible change to the content being consumed by the user and therefore, may not require the UE 102 to reregister and/or reattach to a new node.

Although FIGS. 4 and 5 illustrate example operations, the described operations in FIGS. 4 and 5 (and all other methods and operations disclosed herein) may be performed in other orders different than those illustrated in FIGS. 4 and 5 and multiple steps may be performed simultaneously or in parallel. Furthermore, in some embodiments, one or more operations illustrated in FIGS. 4 and 5 may be omitted, repeated, and/or combined with other operations illustrated in FIGS. 4 and 5, or any other operations and components discussed in this disclosure. In some instances, any of the steps 402-412 and/or 502-512 may be performed at least partly in response to any other of the steps 402-412 and/or 502-512. In some instances, the operations illustrated in FIGS. 4 and 5 may be performed in multiple iterations for instance, to manage connectivity for dozens, hundreds, or even thousands of applications operating on millions of devices.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A method comprising:
    identify one or more applications operating on a User Equipment (UE);
    identify one or more internet protocol (IP) packets being received in association with the one or more applications;
    determine an IP packet rate associated with the one or more IP packets;
    determine that the IP packet rate is below a threshold value;
    start a timer in response to the IP packet rate being below the threshold value; and
    determine that:
        the IP packet rate remains below the threshold value when the timer expires and send a detach message to a node of a communication network; or
        the IP packet rate increases above the threshold value before the timer expires and refrain from sending the detach message to the node of the communication network.

2. The method of claim 1, wherein the node comprises a first node and the method further comprises sending a reattach message to a second node of the communication network in response to determining that the IP packet rate remains below the threshold value when the timer expires.

3. The method of claim 2, wherein the second node comprises a node of at least one of a 4G network or a 5G network.

4. The method of claim 2, wherein the first node comprises a node of a 4G network and the second node comprises a node of a 5G network.

5. The method of claim 2, further comprising attaching to the second node without powering off the UE.

6. The method of claim 2, further comprising monitoring a radio protocol stack of the UE to determine that the IP packet rate is below the threshold value.

7. The method of claim 1, further comprising presenting, on a graphical user interface (GUI) of the UE, a notification indicating that the UE is reattaching to a new node.

8. A system comprising:
    one or more processors; and
    a plurality of programming instructions that, when executed by the one or more processors, cause the system to perform operations including:
        identify one or more applications operating on a User Equipment (UE);
        identify one or more internet protocol (IP) packets being received in association with the one or more applications;
        determine an IP packet rate associated with the one or more IP packets;
        determine that the IP packet rate is below a threshold value;
        start a timer in response to the IP packet rate being below the threshold value; and
        determine that:
            the IP packet rate remains below the threshold value when the timer expires and send a detach message to a node of a communication network; or
            the IP packet rate increases above the threshold value before the timer expires and refrain from sending the detach message to the node of the communication network.

9. The system of claim 8, wherein the node comprises a first node and the operations further include sending a reattach message to a second node of the communication network in response to determining that the IP packet rate remains below the threshold value when the timer expires.

10. The system of claim 9, wherein the second node comprises a node of at least one of a Fourth Generation (4G) network or a Fifth Generation (5G) network.

11. The system of claim 9, wherein the first node comprises a node of a Fourth Generation (4G) network and the second node comprises a node of a Fifth Generation (5G) network.

12. The system of claim 9, wherein the operations further include attaching to the second node without powering off the UE.

13. The system of claim 9, wherein the operations further include monitoring a radio protocol stack of the UE to determine that the IP packet rate is below the threshold value.

14. The system of claim 8, wherein the operations further include presenting, on a graphical user interface (GUI) of the UE, a notification indicating that the UE is reattaching to a new node.

15. A non-transitory computer storage medium having a plurality of programming instructions stored thereon that, when executed by one or more processors of a system, cause the system to perform operations comprising:
    identify one or more applications operating on a User Equipment (UE);
    identify one or more internet protocol (IP) packets being received in association with the one or more applications;
    determine an IP packet rate associated with the one or more IP packets;
    determine that the IP packet rate is below a threshold value;
    start a timer in response to the IP packet rate being below the threshold value; and
    determine that:
        the IP packet rate remains below the threshold value when the timer expires and send a detach message to a node of a communication network; or
        the IP packet rate increases above the threshold value before the timer expires and refrain from sending the detach message to the node of the communication network.

16. The non-transitory computer storage medium of claim 8, wherein the node comprises a first node and the operations further include sending a reattach message to a second node of the communication network in response to determining that the IP packet rate remains below the threshold value when the timer expires.

17. The non-transitory computer storage medium of claim 16, wherein the second node comprises a node of at least one of a Fourth Generation (4G) network or a Fifth Generation (5G) network.

18. The non-transitory computer storage medium of claim 16, wherein the operations further include attaching to the second node without powering off the UE.

19. The non-transitory computer storage medium of claim 16, wherein the operations further comprise monitoring a radio protocol stack of the UE to determine that the IP packet rate is below the threshold value.

20. The non-transitory computer storage medium of claim 15, wherein the operations further comprise presenting, on a graphical user interface (GUI) of the UE, a notification indicating that the UE is reattaching to a new node.

* * * * *